United States Patent Office 3,288,217
Patented Nov. 29, 1966

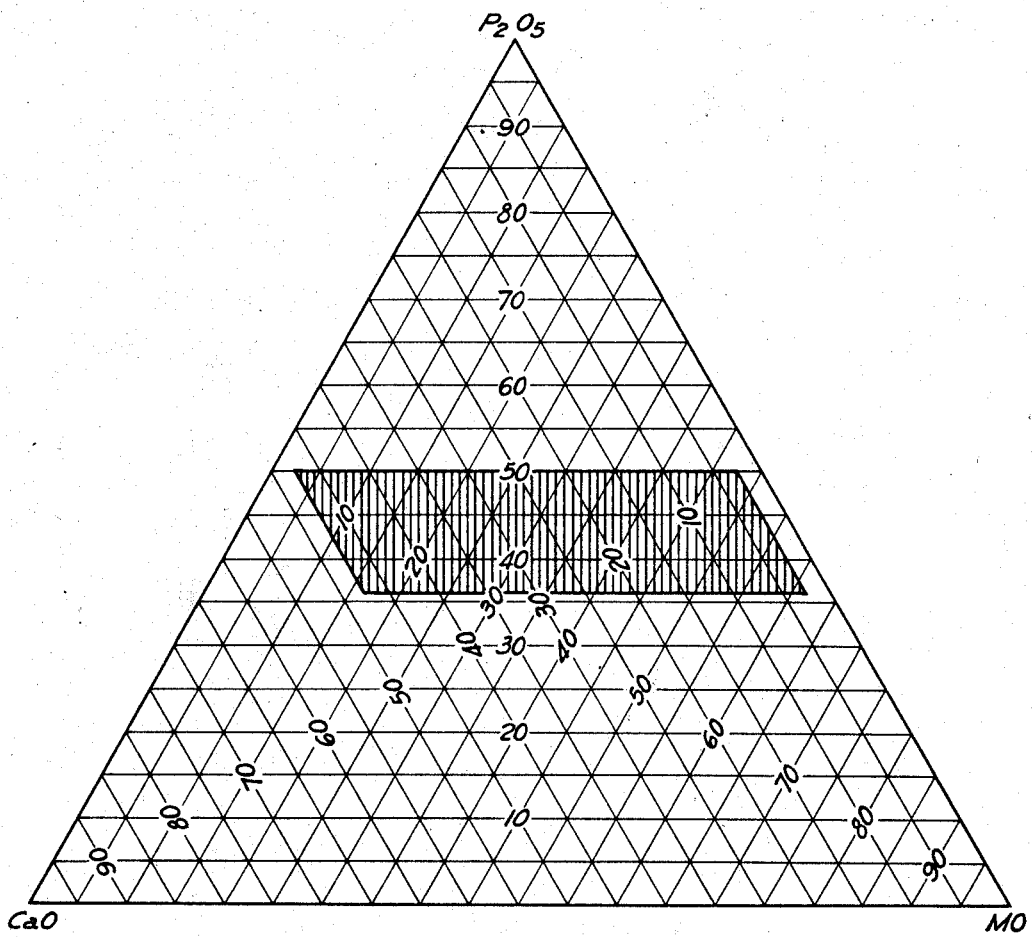

3,288,217
METHOD AND COMPOSITION FOR INHIBITING SCALE DEPOSITION IN OIL-PRODUCING FORMATIONS AND EQUIPMENT
Paul H. Ralston, Bethel Park, Pa., assignor to Calgon Corporation
Filed July 20, 1964, Ser. No. 383,830
15 Claims. (Cl. 166—42)

This invention relates to new glassy phosphate compositions substantially free of alkali metals, which are slowly soluble and particularly useful for inhibiting scale formation or deposition in aqueous systems under high temperature conditions. In particular, it relates to a new series of metal oxide/phosphorous pentoxide glasses within a range of molar ratios of metal oxide to $P_2O_5$ of about 1:1 to about 1.78:1, and to methods of using them for inhibiting scale deposition in oil-producing formations and equipment associated therewith.

It is well known in the art of water treatment to dissolve certain glassy alkali metal phosphate compositions in the water to control water-formed scale depositions on surfaces such as boiler tubes, cooling towers, municipal water supply lines, etc. See, for example, Hatch U.S. Patent 2,539,305. It is likewise known to treat fractured and unfractured oil-producing formations with certain glassy alkali metal phosphates to inhibit the tendency of water and oil mixtures to deposit scale on the underground formations and also on the piping and oil well equipment. See Featherston, Mihrma, and Waters, "Journal of Petroleum Technology," March 1959, page 29, and Earlougher U.S. Patent 3,021,901. However, treatment with phosphate glasses containing alkali metal oxides has proven quite impractical when high formation temperatures and long treatment times are encountered. Conventional alkali metal bearing phosphate glasses cannot practically be used because of their relatively high solution rates under such circumstances.

Attempts to manufacture more slowly soluble materials in the past have been discouraging because the fusion temperatures required to achieve the vitreous or glassy state with conventional compositions are too high in many instances for standard industrial melt furnaces. Modifications of such compositions solely to meet furnace temperature requirements has resulted in glasses which do not have satisfactory solution rates when exposed to high field temperatures and/or high hardness waters of the kind commonly encountered in secondary oilfield operations.

I have invented a group of scale-inhibiting phosphate glasses which have characteristics desirable for their use in high temperature environments for long periods of time. My compositions may be classified as slowly soluble. They will dissolve in typical high temperature oilfield brines at rates which are highly desirable for scale inhibition in oilfield applications, i.e. primary or secondary production and/or fracturing. Moreover, they can be manufactured in conventional furnaces normally used to manufacture phosphate glasses.

My phosphate glasses are in the range of molar ratios of metal oxide: phosphorous pentoxide of about 1:1 to about 1.78:1. My phosphate compositions are basically $$CaO—MgO—P_2O_5$$

glasses which may contain other metal oxides of the group ZnO, PbO, $B_2O_3$, SrO, $Fe_2O_3$, CdO, $Al_2O_3$ and BaO, and combinations thereof in mol percents no greater in sum than the sum of the mol percents of MgO and CaO. They contain at least 2.5 mol percent CaO, at least 2.5 mol percent MgO, and between about 36 mol percent to about 50 mol percent $P_2O_5$. The ternary diagram of the accompanying figure delineates in mol percent the exact range of compositions which constitutes my invention. It will be seen on the drawing that each vertex of the triangle corresponds to a pure component and represents 100 mol percent. Any point within the area is defined in terms of the mol percentage of the three components, i.e. the perpendicular distance toward each of the vertices from the corresponding base. The top vertex represents 100 mol percent $P_2O_5$, the lower left vertex represents 100 mol percent CaO, and the lower right vertex represents 100 mol percent MO. MO represents at least about 2.5 mol percent MgO and the balance selected from the group consisting of ZnO, PbO, $B_2O_3$, SrO, $Fe_2O_3$, CdO, $Al_2O_3$, and BaO and combinations thereof, provided that the sum of MgO and CaO in mol percent shall be at least equal to the sum of mol percent of all other metal oxides. Any glassy composition which falls within the shaded area of the ternary graph under the stated conditions is within the scope of my invention. Thus, it is apparent that my invention is a glassy phosphate composition analytically consisting essentially of CaO, MO, and $P_2O_5$, the composition as represented in mol percent being so selected that in a ternary graph of the system $CaO—MO—P_2O_5$ it lies within the parallelogram defined by the points (a) 47.5 mol percent CaO, 2.5 mol percent MO, 50 mol percent $P_2O_5$, (b) 47.5 mol percent CaO, 16.5 mol percent MO, and 36 mol percent $P_2O_5$, (c) 2.5 mol percent CaO, 61.5 mol percent MO, 36 mol percent $P_2O_5$, and (d) mol percent CaO, 47.5 mol percent MO, and 50 mol percent $P_2O_5$, wherein MO comprises, based on the entire composition, at least 2.5 mol percent MgO, the balance of MO being selected from the group consisting of ZnO, PbO, $B_2O_3$, SrO, $Fe_2O_3$, CdO, $Al_2O_3$, BaO and mixtures thereof, and wherein the sum in mol percent of MgO and CaO is at least equal to the sum in mol percent of the other metal oxides.

Those skilled in the art will recognize the significance of the term "analytically" to modify "consisting essentially of." This means that the glassy fusion products may be said to contain empirically only metal oxides and $P_2O_5$, even though the actual ingredients of the melt may have included phosphates or other salts such as carbonates (from which $CO_2$ is emitted) or phosphoric acid, from which water is driven off, etc.

In the following Table I, the rates of solution of several glasses of my invention are compared with the rates of solution of two alkali metal bearing phosphate glasses. It will be seen that I have accomplished rates of solution of less than about 25 percent per month under the conditions of the test, and some rates are less than one percent per month. These demonstrations were run at approximately 215° F. in brine containing 10% NaCl, 5% $CaCl_2$, and two grams of 12–14 mesh glass per liter of brine. At appropriate intervals during the solution rate test, samples of the phosphate solution were analyzed and the amount of phosphate glass had dissolved was compared to the initial charge. Solution rates under the conditions of the test of 25% per month down to less than 1% per month are useful and practical for the high temperature oil and water mixtures commonly found in fractured and/or producing oil wells. The solution rate of my new glasses for any particular well will be dependent on the bottom hole temperature, solution pH, solution constituents, etc. and can be modified by choice of composition and/or particle size in the ranges required.

| CaO Mol Percent | Na$_2$O Mol Percent | MO Mol Percent | P$_2$O$_5$ Mol Percent | Solution. Rate, Wt Percent/Month |
|---|---|---|---|---|
| 14.7 | 37.6 | | 47.7 | 780 |
| 17.6 | 34.8 | | 47.6 | 610 |
| 45.0 | | 17.5 MgO | 37.5 | <1 |
| 44.9 | | 10.2 MgO | 44.9 | 7 |
| 41.6 | | 20.9 MgO | 37.5 | <1 |
| 40.6 | | 12.2 MgO | 47.2 | 2 |
| 37.7 | | 17.3 MgO | 45.0 | <1 |
| 37.1 | | 12.9 MgO | 50.0 | 25 |
| 36.2 | | 12.7 MgO+2.1 BaO | 49.0 | 3 |
| 36.2 | | 12.7 MgO+2.1 Fe$_2$O$_3$ | 49.0 | 3 |
| 35.9 | | 12.5 MgO+3.2 Al$_2$O$_3$ | 48.4 | <1 |
| 34.8 | | 12.2 MgO+5.8 SrO | 47.2 | 6 |
| 34.7 | | 10.7 MgO+9.1 B$_2$O$_3$ | 45.5 | 9 |
| 34.2 | | 19.6 MgO | 46.2 | 2 |
| 34.2 | | 11.9 MgO+7.8 ZnO | 46.1 | 8 |
| 28.5 | | 5.5 MgO+28.5 PbO | 37.5 | <1 |
| 10.0 | | 24.0 MgO+23.5 B$_2$O$_3$ | 42.5 | <1 |
| 5.5 | | 28.5 MgO+28.5 PbO | 37.5 | <1 |
| 5.0 | | 27.5 MgO+27.5 CdO | 40.0 | 4 |

Within the scope of my invention is the group of phosphate glasses analytically consisting essentially of CaO, MgO, and P$_2$O$_5$ which, when plotted on the ternary graph of the drawing lie within the parallelogram therein delineated, where MO is MgO. The points defining the four corners of the parallelogram are the same except that MgO is substituted for MO.

A preferred glassy composition within the above definition analytically consists essentially of about 34.6 mol percent CaO, about 18.9 mol percent MgO, and about 46.5 mol percent P$_2$O$_5$.

My glassy bi- and poly-metallic compositions are normally made by melting together the appropriate metal oxides and phosphoric acid. The metal oxides and/or carbonates may also be melted together with appropriate phosphate salts and/or phosphoric acids to obtain the desired analytical ratios. In some instances it will be feasible to melt together appropriate phosphate salts by themselves. The melt is rapidly cooled to permit the formation of a hard vitreous composition. In most cases of bimetallic or polymetallic oxide compositions, the fusion temperature is somewhat lower than the melting point of any of the individual components. I have not attempted to determine the minimum melting temperatures of each of the various metal oxide combinations within the scope of my invention, since the determination of eutectic temperatures is more or less academic and, to the extent that they may be of practical value, are within the skill of the art to determine.

Glasses within the general definition of my invention may be used successfully to combat scale deposition by oilfield brines and waters in contact with oil-producing formations and equipment. In this procedure, enough glassy phosphate of a composition within the above terms is contacted by the oilfield brine or water to provide a dissolved concentration of at least one part by weight per million parts of brine or water, and generally about one part glassy phosphate per million parts brine or water to about one hundred parts glassy phosphate per million parts brine or water. The brine or water which then contacts oil well piping, pumps, fractures, and other surfaces, is inhibited against depositing scale. I prefer to use no greater than about 25 p.p.m. for economic reasons. Use of my new glasses within this range of concentrations under field conditions in a high temperature oilfield brine resulted in excellent scale inhibition over long periods of time. When my new glass was included in particulate form and placed in contact with produced brine at the bottom of a well bore, production was maintained at a higher rate than was previously maintained without treatment, indicating that scale deposition in the tubing and equipment was successfully inhibited. For well bore purposes, I may use particles having one dimension as much as two inches; mesh sizes less than 8 (U.S. Standard) are not practical for well bore use.

As is known in the art, fracturing fluid is injected into a subterranean formation with sufficient force and under sufficient pressure to fracture the formation. Glassy phosphates of my invention may be carried by the fracturing fluid into the formation in particulate form, there to dissolve slowly and inhibit the deposition of scale in the fractures and on tubing, equipment, and the like. In fracturing, I prefer to use U.S. Standard mesh sizes of about 8 to about 60 of my new phosphate glasses.

My invention is not restricted to the above illustrative specific examples. It may be otherwise practiced within the scope of the following claims.

I claim:
1. A glassy phosphate composition analytically consisting essentially of CaO, MO, and P$_2$O$_5$, the composition as represented in mol percent being so selected that in a ternary graph of the system CaO-MO-P$_2$O$_5$ it lies within the parallelogram defined by the points:
   (a) 47.5 mol percent CaO, 2.5 mol percent MO, 50 mol percent P$_2$O$_5$
   (b) 47.5 mol percent CaO, 16.5 mol percent MO, 36 mol percent P$_2$O$_5$
   (c) 2.5 mol percent CaO, 61.5 mol percent MO, 36 mol percent P$_2$O$_5$
   (d) 2.5 mol percent CaO, 47.5 mol percent MO, 50 mol percent P$_2$O$_5$ where MO comprises, based on the entire composition, at least 2.5 mol percent MgO, the balance of MO being selected from the group consisting of ZnO, PbO, B$_2$O$_3$, SrO, Fe$_2$O$_3$, CdO, Al$_2$O$_3$, BaO and combinations thereof, and wherein the sum in mol percent of the members of the groups ZnO, PbO, B$_2$O$_3$, SrO, Fe$_2$O$_3$, CdO, Al$_2$O$_3$, and BaO is no greater than the sum of the mol percents of CaO and MgO.

2. A glassy phosphate composition analytically consisting essentially of CaO, MgO, and P$_2$O$_5$, the composition as represented in mol percent being so selected that in the ternary graph of the system CaO-MgO-P$_2$O$_5$, it lies within the parallelogram defined by the points:
   (a) 47.5 mol percent CaO, 2.5 mol percent MgO, 50 mol percent P$_2$O$_5$
   (b) 47.5 mol percent CaO, 16.5 mol percent MgO, 36 mol percent P$_2$O$_5$
   (c) 2.5 mol percent CaO, 61.5 mol percent MgO, 36 mol percent P$_2$O$_5$
   (d) 2.5 mol percent CaO, 47.5 mol percent MgO, 50 mol percent P$_2$O$_5$ 3. A glassy phosphate composition analytically consisting essentially of, in mol percent, about 34.6% CaO, about 18.9% MgO, and about 46.5% P$_2$O$_5$.

4. Method of inhibiting scale deposition on metal surfaces and other surfaces in contact with aqueous oilfield fluid comprising dissolving in said aqueous fluid at least about one part by weight of a composition of claim 1 per million parts of aqueous fluid.

5. Method of inhibiting scale deposition on metal surfaces and other surfaces in contact with oilfield aqueous fluid comprising dissolving in said aqueous fluid about one part by weight to about one hundred parts by weight of a composition of claim 1 per million parts of aqueous fluid.

6. Method of inhibiting scale deposition in subterranean fractures comprising incorporating into a fracturing liquid a solid composition of claim 1 in particulate size of about 8 to about 60 U.S. Standard mesh and injecting the fracturing liquid into a subterranean formation with sufficient force and under sufficient pressure to fracture said formation, whereby the composition of claim 1 is carried into the fractures, deposited there and exposed to dissolving aqueous fluid.

7. Method of inhibiting scale deposition on tubing and the like in a well bore comprising contacting producing aqueous oilfield fluid at the bottom of a well bore with a composition of claim 1 having a mesh size no less than 8 and no dimension greater than two inches in an amount sufficient to maintain in the aqueous fluid from about one part by weight phosphate per million parts fluid to about one hundred parts by weight phosphate per million parts fluid.

8. Method of inhibiting scale deposition on metal surfaces and other surfaces in contact with aqueous oilfield fluid comprising dissolving in asid aqueous fluid at least about one part by weight of a composition of claim 2 per million parts of aqueous fluid.

9. Method of inhibiting scale deposition on metal surfaces and other surfaces in contact with oilfield aqueous fluid comprising dissolving in said aqueous fluid about one part by weight to about one hundred parts by weight of a composition of claim 2 per million parts of aqueous fluid.

10. Method of inhibiting scale deposition in subterranean fractures comprising incorporating into a fracturing liquid a solid composition of claim 2 in particulate size of about 8 to about 60 U.S. Standard mesh and injecting the fracturing liquid into a subterranean formation with sufficient force and under sufficient pressure to fracture said formation, whereby the composition of claim 2 is carried into the fractures, deposited there and exposed to dissolving aqueous fluid.

11. Method of inhibiting scale deposition on tubing and the like in a well bore comprising contacting producing aqueous oilfield fluid at the bottom of a well bore with a composition of claim 2 having a mesh size no less than 8 and no dimension greater than two inches in an amount sufficient to maintain in the aqueous fluid from about one part by weight phosphate per million parts fluid to about one hundred parts by weight phosphate per million parts fluid.

12. Method of inhibiting scale deposition on metal surfaces and other surfaces in contact with aqueous oilfield fluid comprising dissolving in said aqueous fluid at least about one part by weight of a composition of claim 3 per million parts of aqueous fluid.

13. Method of inhibiting scale deposition on metal surfaces and other surfaces in contact with oilfield aqueous fluid comprising dissolving in said aqueous fluid about one part by weight to about one hundred parts by weight of a composition of claim 3 per million parts of aqueous fluid.

14. Method of inhibiting scale deposition in subterranean fractures comprising incorporating into a fracturing liquid a solid composition of claim 3 in particulate size of about 8 to about 60 U.S. Standard mesh and injecting the fracturing liquid into a subterranean formation with sufficient force and under sufficient pressure to fracture said formation, whereby the composition of claim 3 is carried into the fractures, deposited there and exposed to dissolving aqueous fluid.

15. Method of inhibiting scale deposition on tubing and the like in a well bore comprising contacting producing aqueous oilfield fluid at the bottom of a well bore with a composition of claim 3 having a mesh size no less than 8 and no dimension greater than two inches in an amount sufficient to maintain in the aqueous fluid from about one part by weight phosphate per million parts fluid to about one hundred parts by weight phosphate per million parts fluid.

References Cited by the Examiner
UNITED STATES PATENTS

| | | | |
|---|---|---|---|
| 2,539,305 | 1/1951 | Hatch | 23—105 |
| 2,658,036 | 11/1953 | Core et al. | 252—80 |
| 2,777,818 | 1/1957 | Gambill | 252—8.55 |
| 3,021,901 | 2/1962 | Earlougher | 166—42.1 |

CHARLES E. O'CONNELL, *Primary Examiner.*

J. A. LEPPINK, *Assistant Examiner.*

UNITED STATES PATENT OFFICE
CERTIFICATE OF CORRECTION

Patent No. 3,288,217                                  November 29, 1966

Paul H. Ralston

It is hereby certified that error appears in the above numbered patent requiring correction and that the said Letters Patent should read as corrected below.

Column 2, line 32, after "(d)" insert -- 2.5 --; line 59, after "glass" insert -- which --.

Signed and sealed this 12th day of September 1967.

(SEAL)
Attest:

ERNEST W. SWIDER                               EDWARD J. BRENNER
Attesting Officer                                        Commissioner of Patents